United States Patent
Shields et al.

(10) Patent No.: US 8,254,034 B1
(45) Date of Patent: Aug. 28, 2012

(54) FLUIDIC ADAPTIVE LENS WITH A LENS MEMBRANE HAVING SUPPRESSED FLUID PERMEABILITY

(75) Inventors: Gary Shields, Rancho Santa Fe, CA (US); Robert S. Vasko, San Diego, CA (US); Jeffrey R. Vasko, San Diego, CA (US)

(73) Assignee: Rhevision Technology, Inc., Rancho Santa Fe, CA (US)

( * ) Notice: Subject to any disclaimer, the term of this patent is extended or adjusted under 35 U.S.C. 154(b) by 121 days.

(21) Appl. No.: 12/413,358

(22) Filed: Mar. 27, 2009

Related U.S. Application Data

(60) Provisional application No. 61/040,814, filed on Mar. 31, 2008.

(51) Int. Cl.
*G02B 1/06* (2006.01)

(52) U.S. Cl. .................................................... 359/665

(58) Field of Classification Search .......... 359/665–667, 359/683, 684; 351/159, 168, 177
See application file for complete search history.

(56) References Cited

U.S. PATENT DOCUMENTS

| | | |
|---|---|---|
| 3,598,479 A | 8/1971 | Wright |
| 3,641,354 A | 2/1972 | DeMent |
| 4,261,655 A | 4/1981 | Honigsbaum |
| 4,466,706 A | 8/1984 | Lamothe, II |
| 4,890,903 A | 1/1990 | Treisman et al. |
| 4,913,536 A | 4/1990 | Barnea |
| 5,233,470 A | 8/1993 | Wu |
| 5,443,506 A | 8/1995 | Garabet |
| 5,446,591 A | 8/1995 | Medlock |
| 5,886,332 A | 3/1999 | Plesko |
| 5,917,657 A | 6/1999 | Kaneko et al. |
| 5,973,852 A | 10/1999 | Task |
| 6,081,388 A | 6/2000 | Widl |
| 6,188,526 B1 | 2/2001 | Sasaya et al. |
| 6,304,364 B1 | 10/2001 | Qin et al. |
| 6,369,954 B1 | 4/2002 | Berge et al. |
| 6,498,353 B2 | 12/2002 | Nagle et al. |
| 6,618,208 B1 | 9/2003 | Silver |
| 6,638,306 B2 | 10/2003 | Cumming |
| 6,718,074 B1 | 4/2004 | Dutta-Choudhury et al. |
| 6,737,646 B2 | 5/2004 | Schwartz |
| 6,891,682 B2 | 5/2005 | Aizenberg |
| 6,977,777 B1 | 12/2005 | Wick |
| 6,999,238 B2 | 2/2006 | Glebov |

(Continued)

FOREIGN PATENT DOCUMENTS

FR 892220 A 3/1944

(Continued)

OTHER PUBLICATIONS

PCT Application PCT/US05/10948 International Search Report mailed Jun. 14, 2006.

(Continued)

*Primary Examiner* — Joseph P Martinez
(74) *Attorney, Agent, or Firm* — Cooley LLP

(57) ABSTRACT

Fluidic adaptive lens devices containing impermeable elastomer membrane, and systems employing such lens devices, along with methods of fabricating such lens devices, are disclosed. In the embodiments, processes and techniques of creating transparent, impermeable elastomer membranes are disclosed. The membranes thus produced display no or extremely slow permeation for at least one fluid suitable for the fluidic adaptive lenses.

18 Claims, 3 Drawing Sheets

U.S. PATENT DOCUMENTS

| | | | |
|---|---|---|---|
| 7,038,701 B2 | 5/2006 | Niemi | |
| 7,041,134 B2 | 5/2006 | Nguyen et al. | |
| 7,065,256 B2 | 6/2006 | Alon et al. | |
| 7,068,439 B2 | 6/2006 | Esch et al. | |
| 7,126,903 B2 | 10/2006 | Feenstra et al. | |
| 7,256,943 B1 | 8/2007 | Kobrin et al. | |
| 7,261,737 B2 | 8/2007 | Esch et al. | |
| 7,367,550 B2 | 5/2008 | Lee | |
| 7,405,884 B2 | 7/2008 | Nishioka et al. | |
| 7,443,596 B1 | 10/2008 | Berge | |
| 7,453,646 B2* | 11/2008 | Lo | 359/665 |
| 7,549,806 B2 | 6/2009 | Huang | |
| 7,594,726 B2 | 9/2009 | Silver | |
| 7,627,236 B2 | 12/2009 | Ojai | |
| 7,646,544 B2 | 1/2010 | Batchko et al. | |
| 7,675,686 B2 | 3/2010 | Lo et al. | |
| 2001/0017985 A1 | 8/2001 | Tsuboi et al. | |
| 2002/0176148 A1 | 11/2002 | Onuki et al. | |
| 2003/0095336 A1 | 5/2003 | Floyd | |
| 2004/0017492 A1 | 1/2004 | Stavely | |
| 2004/0189830 A1 | 9/2004 | Pollard | |
| 2005/0055025 A1 | 3/2005 | Zacouto et al. | |
| 2005/0200973 A1 | 9/2005 | Kogo et al. | |
| 2005/0270664 A1 | 12/2005 | Pauker et al. | |
| 2006/0092505 A1 | 5/2006 | Abnet et al. | |
| 2006/0125937 A1 | 6/2006 | LeGall et al. | |
| 2007/0211207 A1 | 9/2007 | Lo et al. | |
| 2008/0218873 A1 | 9/2008 | Batchko et al. | |
| 2009/0147371 A1* | 6/2009 | Lee et al. | 359/665 |

FOREIGN PATENT DOCUMENTS

| | | |
|---|---|---|
| FR | 1117690 A | 5/1956 |
| GB | 1327503 A | 8/1973 |
| GB | 2184562 | 6/1987 |
| JP | 60057308 A | 4/1985 |
| JP | 62005201 A | 1/1987 |
| JP | 2002169005 | 6/2002 |
| WO | 0058763 A1 | 10/2000 |
| WO | 0214926 | 2/2002 |
| WO | 02061681 | 8/2002 |
| WO | 03015669 | 2/2003 |
| WO | 03069380 | 8/2003 |
| WO | 2004038480 A1 | 5/2004 |
| WO | 2004102250 A1 | 11/2004 |
| WO | 2005073895 A1 | 8/2005 |
| WO | 2006011937 A2 | 2/2006 |
| WO | 2006088514 A2 | 8/2006 |

OTHER PUBLICATIONS

PCT Application PCT/US05/10948 IPRP and Written Opinion.
U.S. Appl. No. 12/039,615 Non-Final Rejection mailed Dec. 31, 2009.
U.S. Appl. No. 12/039,615 Final Rejection mailed Sep. 3, 2010.
Data sheet for Optical Fluid LS-5257, printed on Mar. 16, 2010 from http://www.focenter.com.
Jo, Byung-Ho, et al., Journal of Microelectromechanical Systems, vol. 9, No. 1, Mar. 2000, pp. 76-81.
Ng, et al., Light Field Photography with a Hand-Held Plenoptic Camera, Stanford University Computer Science Tech Report CSTR 2005-02 Apr. 2005.
Rawicz and Mikhailenko, Modeling a Variable-Focus Liquid-Filled Optical Lens, Applied Optics, vol. 35, No. 10, Apr. 1, 1996, p. 1587-1589.
Suriura and Morita, Variable-Focus Liquid-Filled Optical Lens, Applied Optics, vol. 32, No. 22, Aug. 1993, p. 4181-4186.
Thanawala, et al "Surface modification of silicone elastomer using perfluorinated either," Langmuir, 16(3), (2000) 1256-1260.
U.S. Appl. No. 12/256,961 Non-Final Rejection mailed Mar. 24, 2010.
U.S. Appl. No. 11/683,141 Non-Final Rejection mailed Nov. 23, 2007.
U.S. Appl. No. 10/599,486 Non-Final Rejection mailed Mar. 18, 2008.
U.S. Appl. No. 10/599,486 Non-Final Rejection mailed Dec. 15, 2008.
University of Wisconsin-Madison College of Engineering, Autonomous lenses may bring microworld into focus, vol. 33, No. 1, Fall 2006, pp. 1 and 3.
Xia, Younan, et al., Angnew. Chem. Int. Ed., 1998, 37, pp. 550-575.
Zhang, D-Y., et al., "Fludic Adaptive Lens with High Focal Length Tunability," Applied Physics Letters, 82(19):3171-3172, May 2003.
U.S. Appl. No. 12/490,175 Non-Final Rejection mailed Mar. 21, 2011.

* cited by examiner

FLUIDIC ADAPTIVE LENS WITH A LENS MEMBRANE HAVING SUPPRESSED FLUID PERMEABILITY

CROSS REFERENCE TO RELATED APPLICATIONS

This application claims priority under 35 U.S.C. §119(e) to U.S. Provisional Patent Application Ser. No. 61/040,814, entitled Fluidic Lens And Reservoir With Impermeable Elastomeric Membrane, filed on Mar. 31, 2008. This application is also related to United States Utility patent application Ser. No. 12/039,615, entitled Systems And Methods For Effecting Zoom And Focus Using Fluidic Adaptive Lenses filed Feb. 28, 2008. The content of these applications are hereby incorporated by reference herein in its entirety for all purposes.

FIELD OF THE INVENTION

The present invention relates to adaptive fluid lenses and reservoirs containing barriers to prevent fluid permeation. In particular, but not by way of limitation, the present invention relates to liquid lenses, liquid balloons, liquid pumps, and drug delivery devices.

BACKGROUND OF THE INVENTION

In the application of optical imaging, one can fabricate a lens with variable focal distance by filling transparent liquid in a fluid chamber where at least one surface in the optical path contains a flexible membrane. When an extra amount of fluid is injected into the liquid chamber, the shape of the membrane changes with the increasing pressure and as a result, parallel light rays passing the membrane are bent and approximately meet at a tight position called focal point. When one varies the amount of fluid in the fluid chamber to change the shape of the flexible membrane, the focal point changes. Without changing the position of the fluidic lens from a CMOS or CCD image sensor, a fluidic lens can form images of objects at different distances by adjusting its focal distance. To achieve reliable and reproducible performance, the profile of the membrane should be determined by the fluidic pressure inside the lens chamber. Under a given pressure difference between the lens chamber and the ambient, the membrane should always produce a corresponding profile and therefore a focal distance. This requires that the membrane has to be highly elastic, absent of plastic deformation over the entire range of operation. Elastomer such as rubber and silicone can meet the above requirement, and a particular type of elastomer, poly(dimethylsiloxane) or PDMS, is attractive to fluidic adaptive lens because PDMS has high optical transparency.

Fluidic lenses can be incorporated into a myriad of optical systems that employ lenses such as cameras, microscopes, video monitors, video recorders, optical recording mechanisms, surveillance equipment, inspection equipment, agile imaging equipment, target tracking equipment, copy machines, scanners, etc. It would be advantageous if the fluidic lens or lens system could be implemented in zoom lens systems in a manner that reduced the need for complicated mechanical systems for controlling relative positioning of multiple lenses within the zoom lens systems. It also would be advantageous if a zoom lens system employing the fluidic lens or lens system could be compactly implemented on one or more types of physically small "electronic gadgets" such as cell phones, personal digital assistants (PDAs), or notebook computers.

Furthermore, because fluidic lens changes its focal distance in a similar manner as human eyes change their focus, fluidic lenses can be implanted into eyes to restore or enhance human vision. For implanted fluidic lens, it becomes cumbersome to use an external device such as a micro-pump or a micro actuator to inject or remove fluid into or out of the lens chamber. A more attractive lens structure is to form a flexible-shape fluid vessel without liquid inlet or outlet. In addition to the elastomer membrane in the direct optical path, one can incorporate additional elastic structures so that when an external force is employed, the overall shape of the vessel changes to a new equilibrium shape, and so does the focal distance of the fluidic lens. Compared with fluidic adaptive lenses using external actuators to change the fluidic volume inside the lens chamber, the design of variable shape liquid vessel tend to produce a smaller tuning range in focal distance. However, since the lens in human eye has a tuning range of no more than 10 dioptres, the design of variable shape fluidic vessel becomes attractive.

However, many elastomer materials used to form fluidic lenses do not produce a strong enough diffusion barrier for the fluid inside the fluidic vessel or lens chamber. When the chamber is pressured for an extended period (e.g. several hours or days) or heated to a higher than room temperature (e.g. 60 C), the fluid can permeate through the elastomer membrane. In other cases, the lens fluid can be incorporated into the matrix of the elastomer and cause wrinkling of the membrane. This effect is often called 'swelling'. The molecular structure that makes the material highly elastic often shows strong tendency for fluid permeation. For instance, PDMS (e.g. Sylgard 184 from Dow Corning or Gelest 1.41 from Gelest, Inc.) has shown superb elastic properties and optical properties from UV, visible, and near infrared light, but the material is highly permeable. Under a positive chamber pressure of a few psi, fluid can diffuse through the PDMS membrane easily and form fluid droplets or patches of fluid on the outer surface of the membrane within hours. The problem of fluid permeation becomes a limiting factor for fluidic lenses.

Generally speaking, all polymers interact to a degree with fluids (liquids, gases), physico-chemically (i.e. swelling) and/or chemically. The extent of swelling depends primarily on the chemical similarity of the fluid and the polymer—"like swells like". For instance, the all-hydrocarbon elastomer EPDM is swollen significantly by aliphatic hydrocarbon liquids, but negatively by water. The oil resistance of nitrile elastomer increases with acrylonitrile content of the base polymer, as does the glass transition temperature. For PDMS, a biocompatible elastomer particularly suitable for fluidics lenses and drug delivery devices, serious swelling occurs in hydrocarbon such as mineral oil and high permeation rate occurs with silicone oil, which is a popular lens fluid. For another class of lens fluid: polyphenyl ether (PPE) and polyphenyl thiol ether, swelling is not observed but permeation through the PDMS membrane still occurs. It is therefore advantageous to reduce or eliminate permeation through the lens membrane.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

The invention can provide a tunable lens system, method for manufacturing the tunable lens system and method for operating the tunable lens system. Some embodiments of the invention concern fluidic lenses made of a liquid filled lens chamber and a transparent elastomer membrane. The lens fluid and the elastomer membrane material are selected so that neither swelling nor permeation occurs over an extended time period and over operating and storage temperature ranges. One seemingly good choice is to use PPE lens fluid with PDMS membrane. At low pressure and room temperature, no appreciable swelling or permeation is observed for more than a month. However, when the chamber pressure increases to >2 psi and the temperature rises to >40 C, PPE droplets start to form on the outer surface of the PDMS membrane through permeation. Therefore, the above material system can only operate at lower than room temperature. The present invention provides a more robust solution for the elastomer membrane so that the membrane can work with various kinds of lens fluids without the problems of swelling or permeation over a wide temperature range.

Construction of fluidic lenses involves forming a fluidic chamber consisting of one or more layers of the membranes described below. The chamber wall is made of any material such as metal, metal alloy, ceramic, glass, or plastic that is more rigid than the membrane and not permeable by the optical fluid. To form a fluidic lens capable of plano-convex and plano-concave configuration, one layer of any of the membranes described below, typically about 0.1 mm in thickness, forms one surface of the lens and the other surface is formed with an anti-reflection coated glass, sapphire, or plastic window.

Biconvex or biconcave fluidic lens can be formed from any of various membranes within the scope and spirit of the present invention. The thickness or the modulus of the two elastomer membranes can be different so that the biconcave or biconvex lens can possess an asymmetric geometry. The elastomer membrane can be PDMS with a special class of fluids such as perfluoronated silicone oil or ionic fluid, perfluorinated polyether modified PDMS, plasma-applied fluorocarbon coated PDMS, PDMS co-reacted with a fluoroalkyl silane, PDMS with soluable fluoropolymer/silicone hybrid coating, perfluoroelastomer, or any elastomer that is at least partially transparent and can eliminate or slow down fluid permeation.

In accordance with one embodiment, a lens device comprises a lens chamber including a plurality of surfaces, wherein at least one surface of the plurality of surfaces is optically transparent. The lens device further comprises a lens membrane coupled to the lens chamber, wherein the lens membrane and the lens chamber define a first cavity, and wherein at least a portion of the lens membrane is flexible and optically transparent. The lens device further comprises a fluidic medium positioned within the first cavity, wherein the fluidic medium is optically transparent. Finally, the lens device comprises a control device capable of controlling a focal distance of the lens device.

BRIEF DESCRIPTION OF THE DRAWINGS

Various objects and advantages and a more complete understanding of the present invention are apparent and more readily appreciated by reference to the Detailed Descriptions and the appended claims when taken in conjunction with the accompanying Drawings wherein:

DETAILED DESCRIPTION

The present invention relates to the design and construction of elastomer membrane with suppressed fluid permeability, as well as the use of one or more such elastomer membranes to form fluidic adaptive lenses in a variety of environments such as in eyeglasses and zoom lens systems. One of skill in the art will recognize alternative environments to which the present invention may be applied, including cameras, microscopes, video monitors, video recorders, optical recording mechanisms, bar-code readers, systems with magnifying functions, surveillance equipment, inspection equipment, machine vision equipment, surgical cameras, agile imaging equipment, target tracking equipment, copy machines, scanners, cell phones, personal digital assistants (PDAs), notebook computers, telescopes, magnifying glasses, optometrist equipment, glasses, implanted vision restoration devices, and other devices that require lenses.

The present invention also relates generally to the design and implementation of fluid impermeable membranes for fluidic adaptive lenses, independent of any particular application of such lenses. The present invention is intended to encompass a variety of different lenses, lens structures and lens systems that employ one or more fluidic adaptive lenses with impermeable membranes that are variable in terms of optical characteristics, including a variety of lens types such as convex, concave, convex-concave, positive or negative meniscus, plano-convex, plano-concave, bicovex and biconcave lenses.

One method to suppress fluid permeation and prevent swelling is to employ a multi-layer structure. For example, the first layer contains a melt-processible thermoplastic such as polyamides and/or thermoplastic elastomer. The second layer contains a second melt-processible thermoplastic chemically dissimilar from the melt-processible thermoplastic employed in the first layer. Typically, the second layer that functions as a diffusion barrier is thinner than the first layer and is composed of a material which is chosen for its ability to block diffusion of organic materials to the first layer. The materials blocked could be organic compounds such as aliphatic hydrocarbons, alcohols and other materials. The materials of choice for the diffusion barrier may be polyamides such as Nylon 6, Nylon 6.6, Nylon 11 and Nylon 12.

Figure 5:
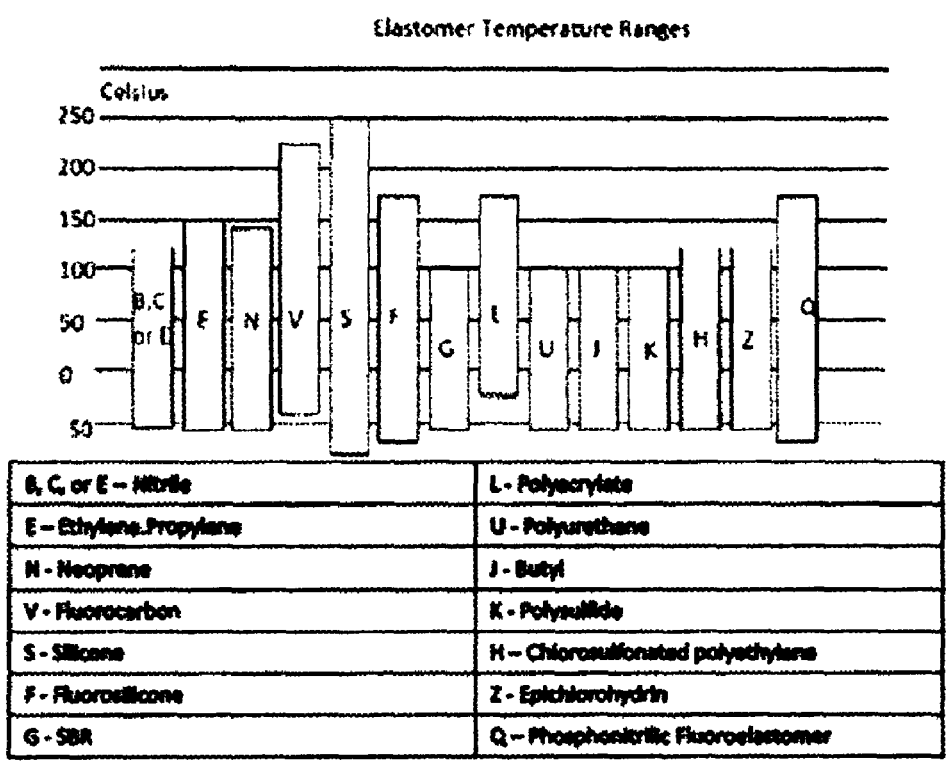
FIG. 5 shows a Table 1 showing a list of elastomer materials and the range of their operation termparatures.

Referring to FIG. 5, Table 1 shows a list of elastomer materials and the range of their operation temperatures. These are the common types of elastomer material for the devices of concern in accordance with the present invention. They are candidates to form a multi-layer elastomer membrane structure. For reliable and reproducible devices, every material chosen to form the compound elastomer membrane is preferably an elastomer. If one material in the multilayer structure is not an elastomer, the layer of that material has to be much thinner than the other materials and must have good adhesion to the adjacent materials to avoid de-lamination after many stretch cycles.

Figure 1:
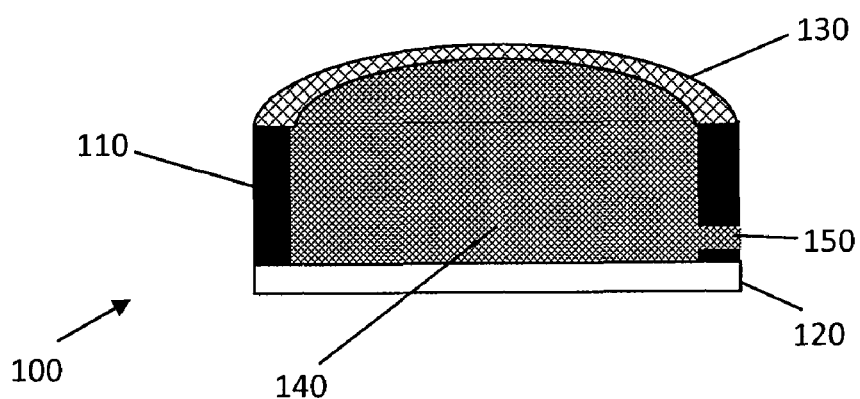
FIG. 1 shows, in simplified schematic form, a cross-sectional view of one embodiment associated with a plano-convex fluidic adaptive lens of the present invention.

Referring to FIG. 1, an exemplary fluidic adaptive lens containing a single impermeable elastomer membrane is shown in schematic form. FIG. 1 shows a cross-sectional view of one embodiment of a lens structure. As shown, FIG. 1 comprises a body defining the boundary of the lens chamber 110, a bottom surface 120, an impermeable elastomer membrane 130, a fluidic medium 140, and a fluid path 150. The fluid path 150 provides the pathway for fluid exchange between the lens chamber and the external environment. The membrane 130 in FIG. 1 is shown to create a convex lens due to a higher pressure inside the lens chamber than the surrounding. When the relation of pressure is reversed, the membrane 130 can form a concave lens. The elastomer membrane 130 can be PDMS with a special class of fluids such as perfluoronated silicone oil or ionic fluid, perfluorinated polyether modified PDMS, plasma-applied fluorocarbon coated PDMS, PDMS co-reacted with a fluoroalkyl silane, PDMS with soluable fluoropolymer/silicone hybrid coating, perfluoroelastomer, or any elastomer that is at least partially transparent and can eliminate or slow down fluid permeation.

Additional description regarding the elastomer membrane 130 and fluidic medium 140 is provided below.

PDMS with Perfluoronated Silicone Oil, Ionic Fluid

PDMS that is formulated and processed to the manufacturer's guidelines when used in conjunction with perfluoronated silicone and ionic optical fluids such as but not limited to Nusil LS-5229, LS-5248, LS-5252 & LS-5257 do not permeate provided that the PDMS membrane is free from defects such as but not limited to pinholes, micro fractures and contaminants.

Perfluorinated Polyether Modified PDMS

The publication by S. K. Thanawala and M. K. Chaudhury, "Surface modification of silicone elastomer using perfluorinated ether," *Langmuir*, 16(3), 1250 (2000), describes how the surface tension of a PDMS film was lowered from 22 to 8 dyne/cm (mN/m) by mixing with 1 to 1.5% of a perfluorinated polyester. The final surface tension of 8 dyne/cm is nearly equivalent with that of poly-tetrafluoroethylene or PTFE Teflon and would cause oils such as thioether or petroleum distillates to "bead" on its surface. In other words, these liquids should have a high contact angle (>85°) on the surface of perfluorinated polyether modified PDMS and thus be repelled from it and not permeate through.

PDMS could be Dow Corning's Sylgard 184, Gelest 1.41, or Gelest 1.43, the fluorinated material can be derived from a DuPont product whose trade name is Krytox, a perfluorinated polyester. It is an allyl amide-functionalized Krytox prepared by DuPont. The material reacts with the PDMS so that it is chemically bonded to the elastomer and thus cannot be solvent-extracted or evaporate away. It is added to the PDMS immediately after mixing both parts of the liquid elastomer kit and would thus participate in the cure. Curing conditions are around 3 hours at 75° C. The viscosity of the Krytox is low enough and the cure time long enough that it migrates to the surface and preferentially puts fluorine on the surface and not in the bulk. This promotes lower surface tension at very small concentrations of the Krytox and does not significantly affect the physical properties of the elastomer. If the concentration of Krytox is kept below 1.5%, the film remains transparent. One can also use allyl ether-modified Krytox to replace allyl amide-functionalized Krytox in the process.

Plasma Applied Fluorocarbon Coating

Room temperature (cold plasma), ambient pressure technology can be used to apply fluorocarbons to the membrane surface. The coatings are very thin with depths typically about 10 to 100 nm. The coated film is very durable and the process is used for commercial production. It is reported that after coating a polypropylene film with poly(heptadecafluorodecene) a droplet of hexadecane (a representative hydrocarbon oil) has a contact angle of 64° on the coated surface. The contact angle is significantly greater than the uncoated polypropylene. In another example, a 200 nm think perfluorocarbon film is applied to a silicon surface to obtain an 80° contact angle with hexadecane.

The room temperature plasma coating method can be coated to cured silicone rubber which has similar mechanical and chemical properties to PDMS except for its optical transparency. The coating increases the chemical and oil resistance of the cured rubber. However, the magnitude of decrease in surface energy depends on the surface preparation and topology.

Co-Reaction with a Fluoroalkyl Silane

A fluoroalkyl silane product called Z-6704 silane stain repellent is water and oil repellent. The contact angle with an oil, like hexadecane, is about 60° when applied to a stone surface. The material appears designed to protect stone and masonry but if it has a hydrosilane group it can react with the base component of PDMS to give the membrane fluorine functionality. Fluoroalkyl silane when mixed in low proportions with PDMS should preferentially migrate to the surface and provide a permeation barrier.

Soluble Fluoropolymer/Silicone Hybrid Coating

Dow Corning and Daikin developed a Fluoropolymer/Silicone Hybrid Coating to provide oil resistance (http://www.dowcorning.com/content/publishedlit/Easy-Clean-Stay-Clean.pdf). The hybrid material consists of a soluble fluoropolymer base, an isocyanate crosslinking compound and a silicone release agent. The combination of fluoropolymer and silicone gives superior release properties associated with low surface energy (hexadecane contact angel=34°). The Fluoropolymer/Silicone Hybrid Coating is applied to the membrane forming a fluid permeation barrier.

Transparent Colorless Perfluoroelastomer

Clear Perfluoroelastomer (PFE) System such as 3M PFE 300 contains a fully fluorinated polymer and catalyst that when mixed, molded and post-cured will produce optically clear PFE membranes that also provide a fluid permeation barrier.

As previously stated, the above-described embodiments and implementations are for illustration purposes only. Numerous other embodiments, implementations, and details of the invention are easily recognized by those of skill in the art from the following descriptions and claims.

Figure 2:
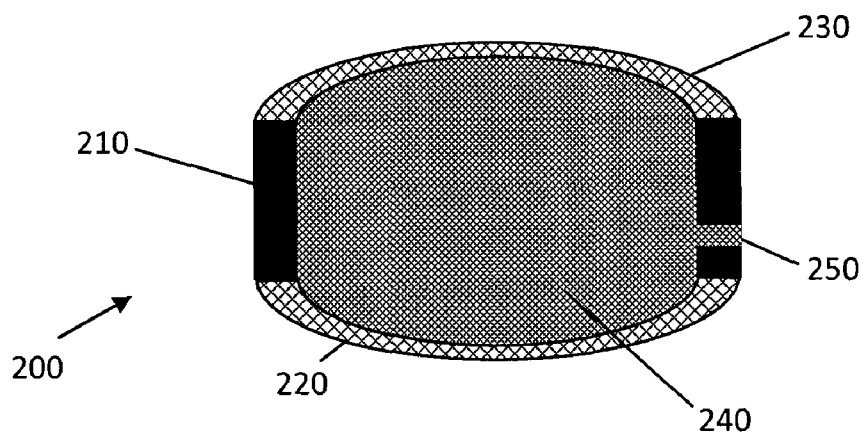
FIG. 2 shows, in simplified schematic form, a cross-sectional view of one embodiment associated with a double-convex fluidic adaptive lens of the present invention.

FIG. 2 shows a cross-sectional view of one embodiment of a lens structure. As shown, FIG. 2 comprises a body defining the boundary of the lens chamber 210, two impermeable elastomer membranes 220 and 230, a fluidic medium 240, and a fluid path 250. The fluid pass 250 provides the pathway for fluid exchange between the lens chamber and the external environment. The membranes 220 and 230 in FIG. 2 are shown to create a double convex lens due to a higher pressure inside the lens chamber than the surrounding. When the relation of pressure is reversed, the membranes 220 and 230 can form a double-concave lens. The elastomer membranes 220 and 230 can be formed in the same method as the membrane 130.

Figure 3:
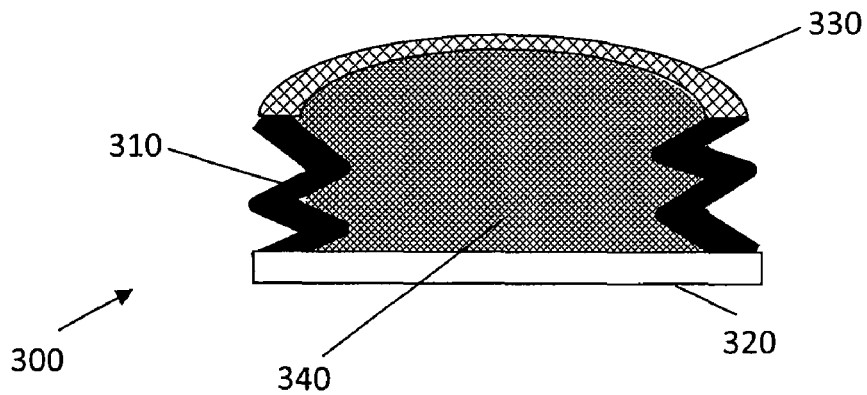
FIG. 3 shows, in simplified schematic form, a cross-sectional view of one embodiment associated with a plano-convex fluidic adaptive lens of the present invention.

FIG. 3 shows a cross-sectional view of one embodiment of a lens structure. As shown, FIG. 3 comprises a bellow defining the boundary of the lens chamber 310, a bottom surface 320, one impermeable elastomer membranes 330, and a fluidic medium 340. When an external force is applied to press the bellow 310 to reduce its height, the elastomer membrane 330 shows a convex shape as shown in the figure. When the applied force extends the height of the bellow 310, the elastomer membrane 330 displays a concave shape. The elastomer membranes 330 can be formed in the same method as the membrane 130.

Figure 4:
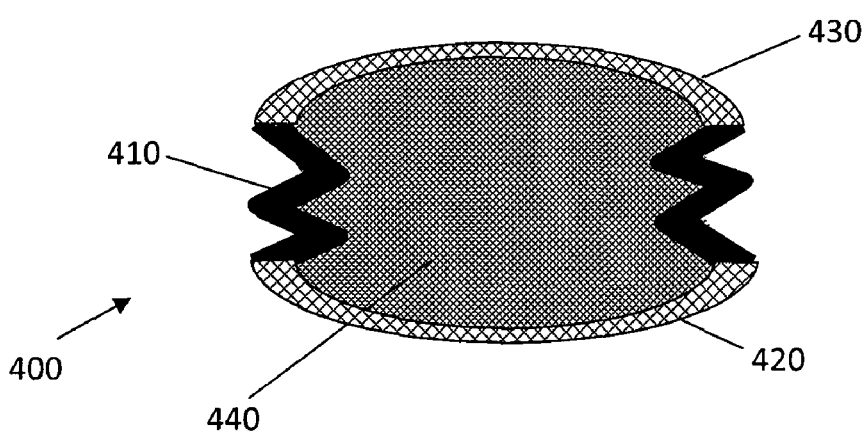
FIG. 4 shows, in simplified schematic form, cross-sectional views of a double-convex fluidic adaptive lens of the present invention.

FIG. 4 shows a cross-sectional view of one embodiment of a lens structure. As shown, FIG. 4 comprises a bellow defining the boundary of the lens chamber 410, two impermeable elastomer membranes 420 and 430, and a fluidic medium 440. When an external force is applied to press the bellow 410 to reduce its height, the elastomer membranes 420 and 430 display a double-convex shape as shown in the figure. When the applied force extends the height of the bellow 410, the elastomer membranes 420 and 430 display a double-concave shape. The elastomer membranes 420 and 430 can be formed in the same method as the membrane 130.

In accordance with one embodiment, a lens device comprises a lens chamber including a plurality of surfaces, wherein at least one surface of the plurality of surfaces is optically transparent. The lens device further comprises a lens membrane coupled to the lens chamber, wherein the lens membrane and the lens chamber define a first cavity, and wherein at least a portion of the lens membrane is flexible and optically transparent. The lens device further comprises a fluidic medium positioned within the first cavity, wherein the fluidic medium is optically transparent. Finally, the lens device comprises a control device capable of controlling a focal distance of the lens device.

The control device can inject or withdraw fluid into or out of the lens chamber, thus altering the focal distance of the lens. The control device may be a human-made device using a mechanical, thermal elastic, piezoelectric, electro-mechanic, or electro-magnetic mechanism, or be made of other materials such as Ti/Ni alloy (muscle wires), conductive polymer, electropolymer or hydrogel. The lens control device could also be made of biological materials and structures found in the biological world, including muscles controlled by the central nerve system, hydraulic devices controlled by the circulation system, and nanostructure actuators such as flagella and APT-powered biomolecular motors, just to name a few. In particular, a ciliary muscle in relation to an intraocular lens may be used.

Those skilled in the art can readily recognize that numerous variations and substitutions may be made in the invention, its use and its configuration to achieve substantially the same results as achieved by the embodiments described herein. In particular, special considerations may be required for the selection of the lens membrane, lens chamber, and fluid medium(s) for each specific application of the present invention. Accordingly, there is no intention to limit the invention to the disclosed exemplary forms. Many variations, modifications and alternative constructions fall within the scope and spirit of the disclosed invention as expressed in the claims.

What is claimed is:

1. A lens device, comprising:
a lens chamber including a plurality of surfaces, wherein at least one surface of the plurality of surfaces is optically transparent;
a lens membrane coupled to the lens chamber, wherein the lens membrane and the lens chamber define a first cavity, and wherein at least a portion of the lens membrane is flexible and optically transparent;
a fluidic medium positioned within the first cavity, wherein the fluidic, medium is optically transparent, and wherein the fluidic medium is selected from the group consisting of a fluid medium containing polyphenyl ether (PPE), a fluid medium containing thioether, a fluid medium containing ionic fluid, a fluid medium containing perfluoronated, silicone oil, a fluidic medium containing water, a fluid medium containing methanol, a fluid medium containing lens oil, a fluid medium containing engine oil, a fluid medium containing saline, a fluid medium containing silicone oil and a fluid medium containing air; and
a control device capable of controlling a focal distance of the lens device, wherein the lens membrane is selected from the group consisting of a lens membrane containing a first polymer disposed to produce elasticity and a second polymer disposed to minimize permeation of the fluidic medium through the membrane a lens membrane containing a perfluorinated polyether modified elastomer, a lens membrane containing an elastomer with a fluorocarbon coating, a lens membrane containing an elastomer co-reacted with fluoroalkyl silane, a lens membrane containing an elastomer with a soluble fluoropolymer-silicone hybrid coating, and a lens membrane containing a perfluoroelastomer.

2. The lens device of claim 1, wherein the lens membrane contains a perfluorinated polyether modified elastomer.

3. The lens device of claim 2, wherein the elastomer is PDMS.

4. The lens device of claim 1, wherein the lens membrane contains an elastomer with a fluorocarbon coating.

5. The lens device of claim 4, wherein the elastomer is PDMS.

6. The lens device of claim 1, wherein the lens membrane contains an elastomer co-reacted with fluoroalkyl silane.

7. The lens device of claim 6, wherein the elastomer is PDMS.

8. The lens device of claim 1, wherein the lens membrane contains.

9. The lens device of claim 8, wherein the elastomer is PDMS.

10. The lens device of claim 1, wherein the lens membrane is a perfluoroelastomer, an elastomer with a soluble fluoropolymer-silicone hybrid coating.

11. The lens device of claim 10, wherein the perfluoroelastomer is 3M PFE 300 or a derivative of 3M PFE 300.

12. The lens device of claim 1, wherein the fluid medium is the fluidic medium containing polyphenyl ether (PPE) or the fluidic medium containing thioether, and wherein the lens membrane is the lens brane containing a perfluorinated polyether modified elastomer.

13. The lens device of claim 1, wherein the fluid medium is the fluidic medium containing ionic fluid, and wherein the lens membrane is the lens membrane containing a perfluoroelastomer.

14. The lens device of claim 1, wherein the fluid medium is the fluidic medium containing perfluoronated silicone oil, and wherein the lens membrane is the lens membrane containing an elastomer with a soluble fluoropolymer-silicone hybrid coating.

15. The lens device of claim 1, wherein the fluidic medium is the fluidic medium containing water, the fluidic medium containing methanol, the fluidic medium containing lens oil, the fluidic medium containing engine oil, the fluidic medium containing saline, the fluidic medium containing silicone oil or the fluidic medium containing air, and wherein the lens membrane is the lens membrane containing an elastomer co-reacted with fluoroalkyl silane.

16. A lens device, comprising:
a lens chamber including a plurality of surfaces, wherein at least one surface of the plurality of surfaces is optically transparent;

a lens membrane coupled to the lens chamber, wherein the lens membrane and the lens chamber define a first cavity, and wherein at least a portion of the lens membrane is flexible and optically transparent;

a fluidic medium positioned within the first cavity, wherein the fluidic medium is optically transparent; and a control device capable of controlling a focal distance of the lens device, wherein the lens membrane contains a first polymer disposed to produce elasticity and a second polymer disposed to minimize permeation of the fluidic medium through the membrane.

17. A lens device, comprising:

a lens chamber including a plurality of surfaces, wherein at least one surface of the plurality of surfaces is optically transparent;

an elastic and optically transparent lens membrane coupled to the lens chamber, wherein the lens chamber and lens membrane define a first cavity; and an optically transparent fluidic medium positioned within the first cavity, wherein the fluid medium contains a fluid selected from the group consisting of ionic fluid, polyphenyl ether (PPE), thioether and perfluoronated silicone oil, wherein the lens membrane contains a first polymer disposed to produce elasticity and a second polymer disposed to minimize permeation of the fluidic medium through the lens membrane.

18. The lens device of claim 17, wherein the second polymer is a fluorocarbon-based polymer that is attached to a surface of the first polymer.

* * * * *